Aug. 15, 1933.   H. D. STEVENS   1,923,027
AUTOMATIC MILL MIXER
Filed Dec. 17, 1929   5 Sheets-Sheet 1

INVENTOR
Horace D. Stevens.
BY
Ely & Barrow
ATTORNEYS.

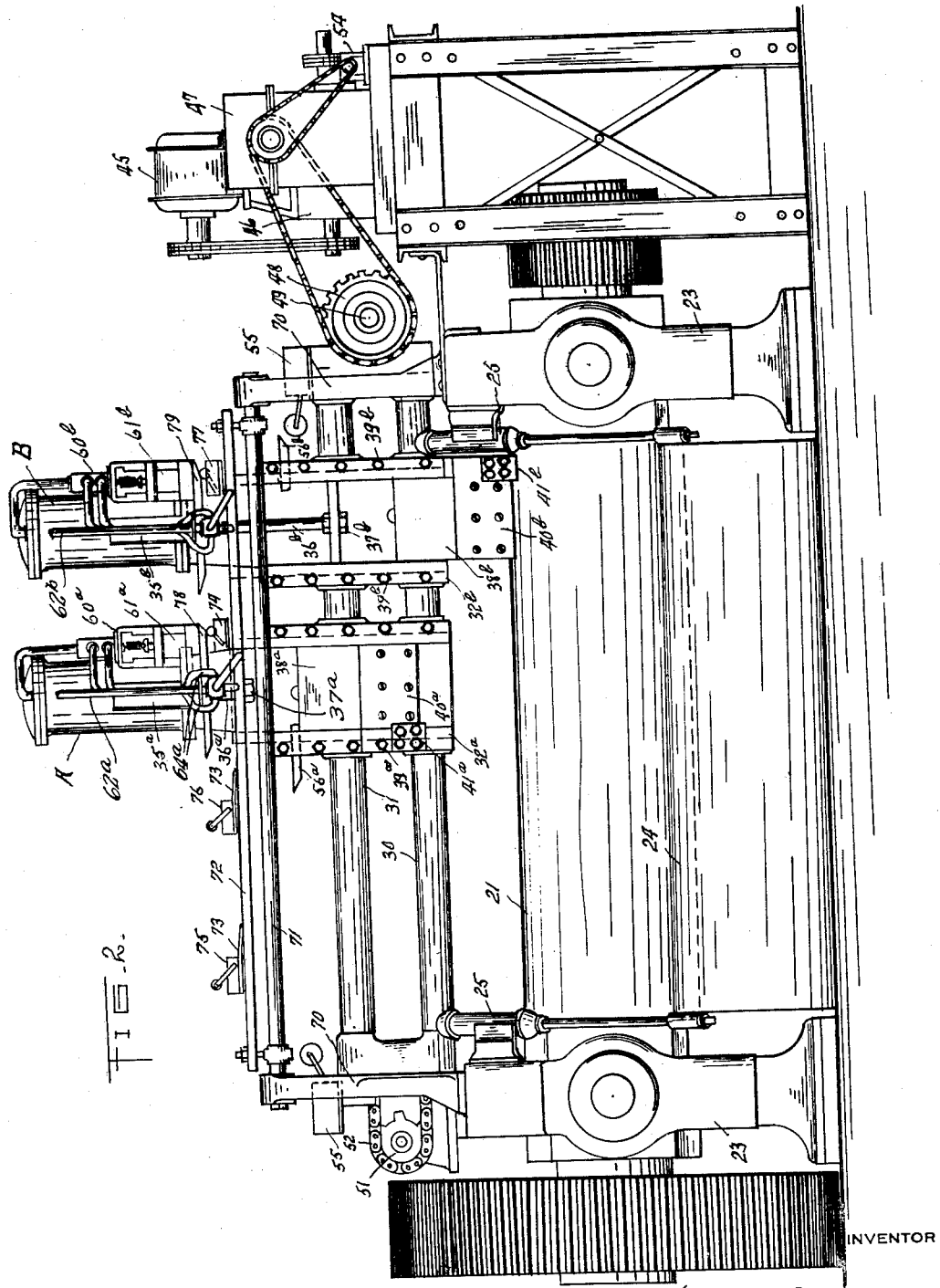

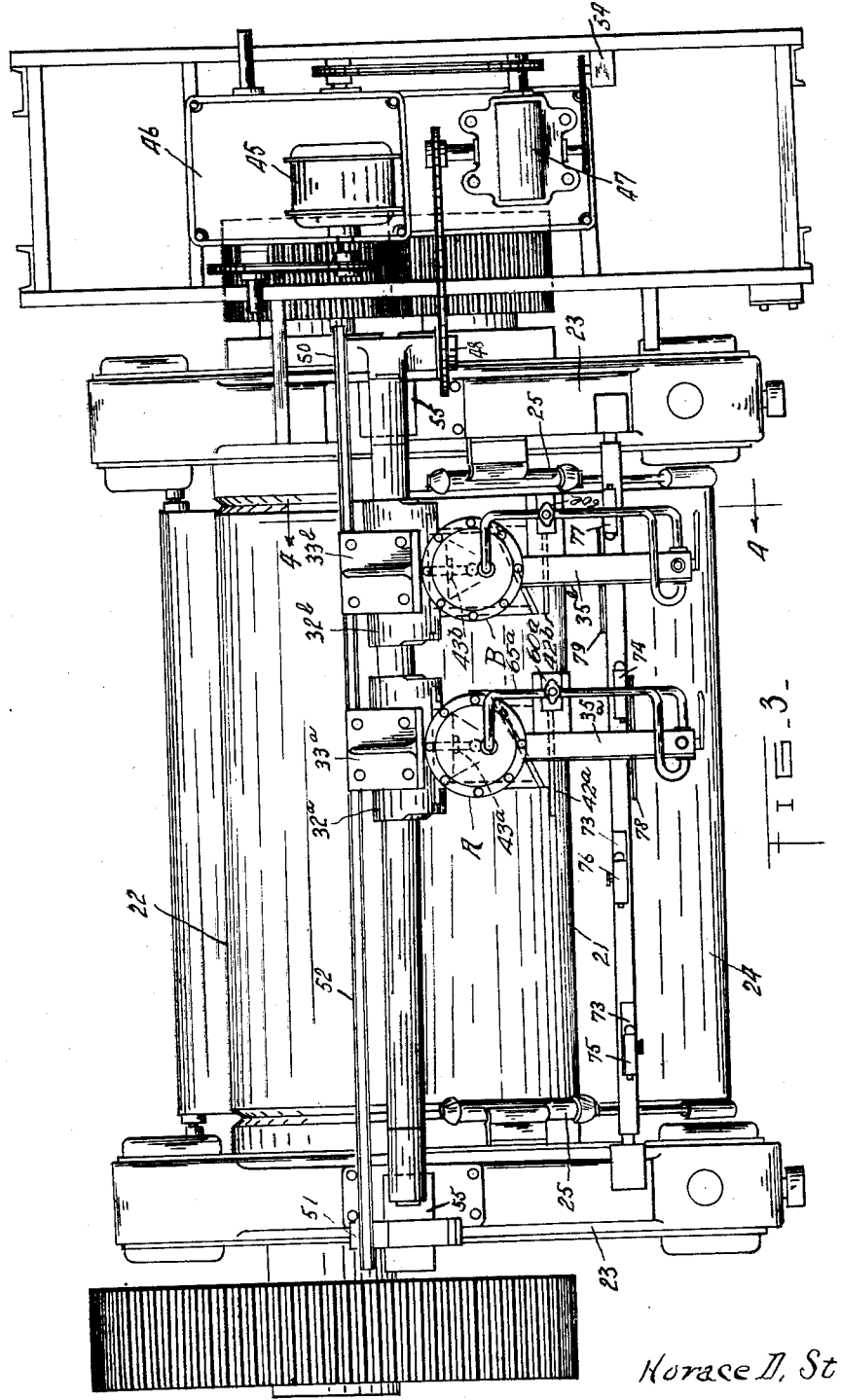

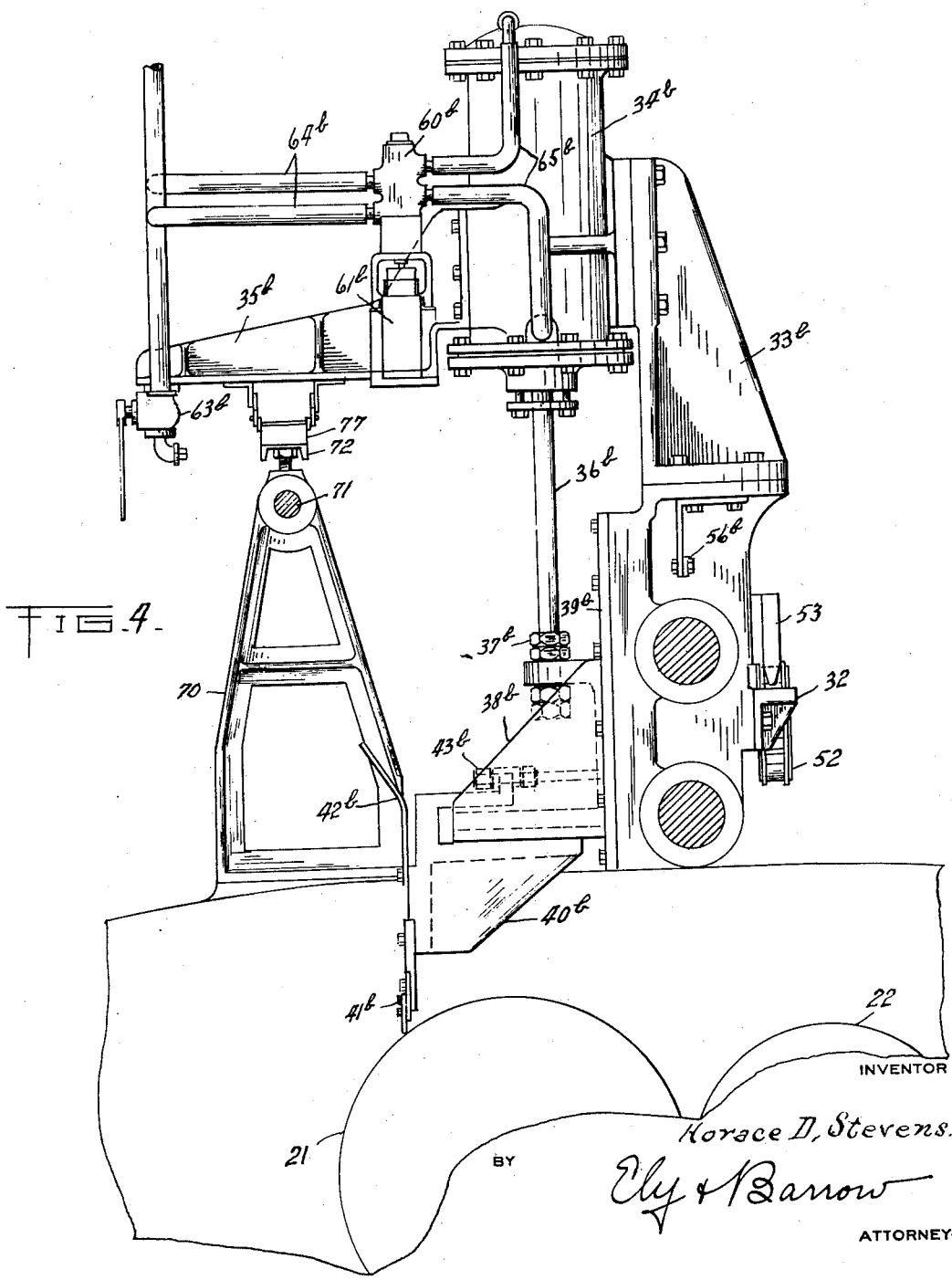

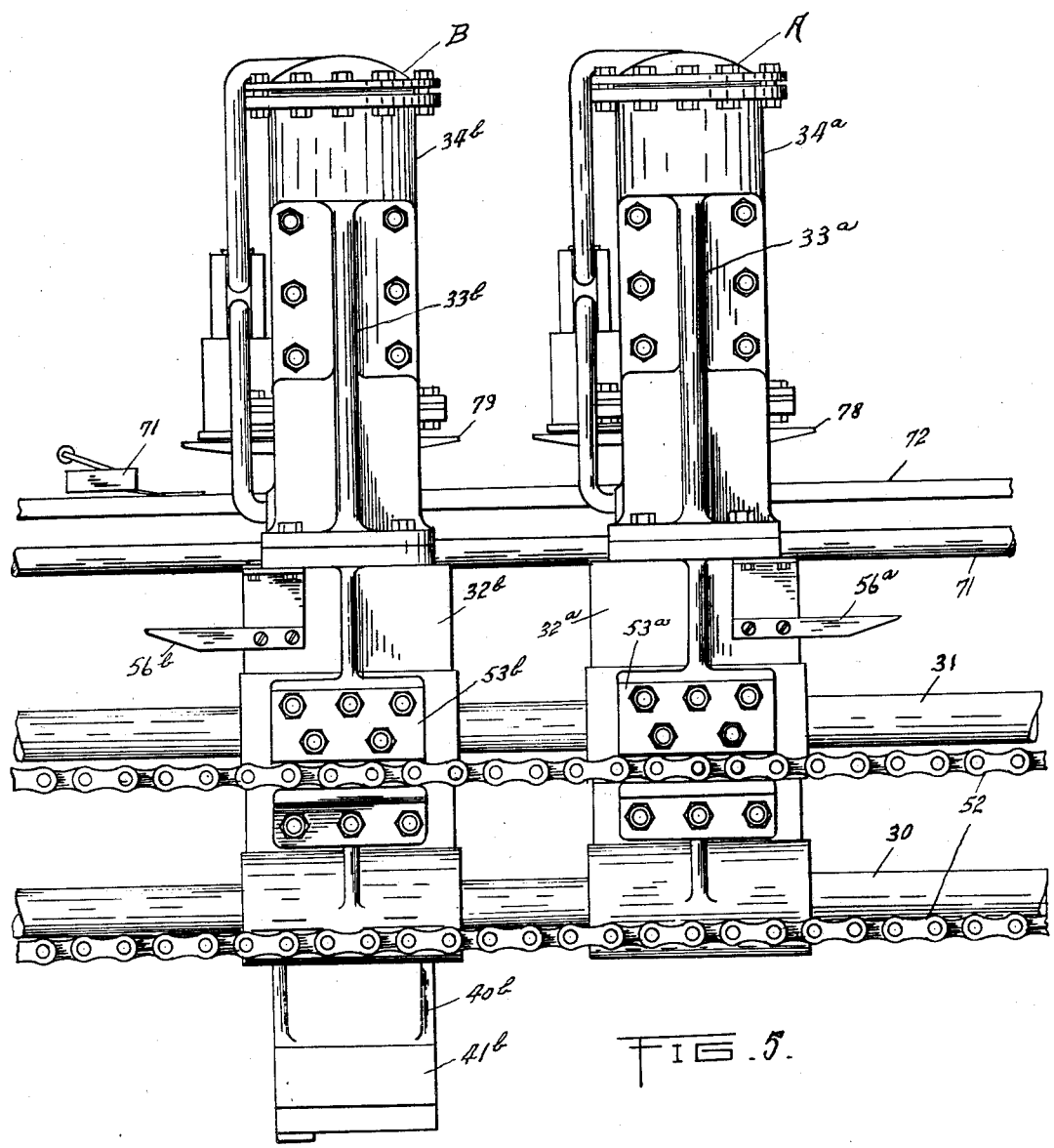

Patented Aug. 15, 1933

1,923,027

UNITED STATES PATENT OFFICE 1,923,027

AUTOMATIC MILL MIXER

Horace D. Stevens, Akron, Ohio, assignor to The Firestone Tire & Rubber Company, Akron, Ohio, a Corporation of Ohio Application December 17, 1929
Serial No. 414,662

16 Claims. (Cl. 18—2)

This invention relates to means for automatically controlling the mixing or warming of plastic material in mills and more particularly to means for automatically mixing rubber batches.

Heretofore, in mixing plastic material such as rubber in mills, it has been necessary for an operator to constantly attend the operation. He must periodically dump in the various chemicals of the mix while working the crude and reclaimed rubber together on the rolls. Then while the batch is mixing he must continually work it on the rolls generally done by cutting a portion of the batch with one hand while rolling it up with the other, and then dumping the roll back between the mill rolls. This operation turns the rubber back on itself and gives a thorough mixing, it, however, must be constantly repeated to obtain a good mix. It is dirty, hard and dangerous work due to the size and composition of the batches as well as the proximity of the hands of the operator to the mill rolls.

It is an object of the invention to provide mechanical mixing means for doing the dirty, hard and dangerous work heretofore done by hand in plastic mixing operations.

A further object of the invention is to provide automatic means for handling the mixing of plastic material.

The above and other objects of the invention are attained by the apparatus illustrated in the accompanying drawings and described below, it being understood that the invention is not limited to the exact embodiment thereof shown and described.

In the drawings:

Figure 2 is a front elevation of a mill equipped with the automatic mixing knives of the invention.

Figure 3 is a plan view of Figure 2.

Figure 4 is an enlarged transverse vertical section on line 4—4 of Figure 3.

Figure 5 is an enlarged rear elevation of the knife units.

Figure 1:
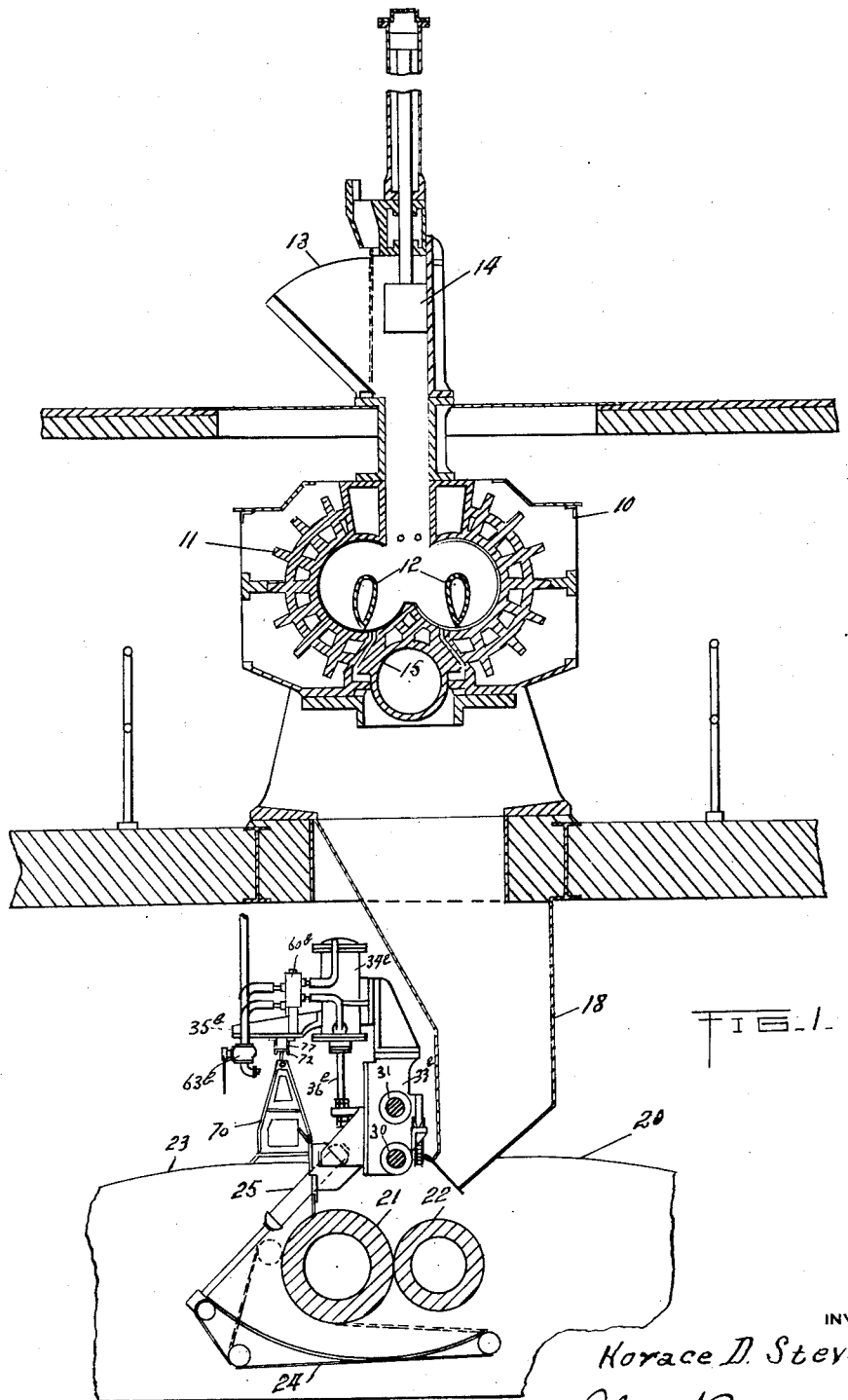
Figure 1 is a diagrammatic vertical section of automatic mixing means embodying the invention.

In the drawings the numeral 10 indicates an internal mixer of the type sold under the name "Banbury". An internal mixer of this type generally comprises a jacketed housing 11 in which is journaled a pair of mixing elements 12. The material to be mixed is fed in through a hopper 13, closed by a plunger 14. A removable bottom 15 allows the completely mixed material to drop out of the mixer.

In the form of the invention shown the internal mixer 10 is preferably connected by a chute 18 to an ordinary mixing mill 20. The mill 20 includes rolls 21 and 22 journaled in a frame 23. The mill 20 may also include an apron 24 which is adapted to be moved into operative position by suitable means such as air motors 25.

Superimposed parallel shafts 30 and 31 fixed to the frame 23 may be employed to sharingly support a pair of mixing plow units A and B. The units may include carriers 32$^a$, 32$^b$ having brackets 33$^a$ and 33$^b$ fixed thereto which support air motors 34$^a$, 34$^b$ and which in turn carry brackets 35$^a$, 35$^b$. Piston rods 36$^a$ and 36$^b$ of the air motors 34$^a$ and 34$^b$ are adjustably secured as at 37$^a$, 37$^b$ to brackets 38$^a$, 38$^b$ which are slidably attached to the carriers 32$^a$, 32$^b$ through the agency of beveled gibs 39$^a$ and 39$^b$.

Brackets 40$^a$ and 40$^b$, adapted to carry plows 41$^a$ and 41$^b$ and guards 42$^a$ and 42$^b$ are slidably and adjustably fixed by suitable means 43$^a$ and 43$^b$ to the brackets 38$^a$ and 38$^b$. As illustrated in Figure 4 when the pistons 36$^a$ and 36$^b$ of the air motors 34$^a$ and 34$^b$ are extended the plows 41$^a$ and 41$^b$ are adapted to just clear the roll 21 so that any material on the roll in the path of the plows will be cut from the roll.

As shown the plows 41$^a$ and 41$^b$ in the preferred form are relatively narrow and parallel to the axis of the roll, however, the width of the plows is dependent upon the plasticity of the material mixed, hence the invention contemplates using various widths of plows as will be apparent. The plow holding brackets 40$^a$ and 40$^b$ are arranged to just clear the material on the roll so that when the plows are in cutting position the brackets serve to roll up the material cut from the roll.

A reversible motor 45 operating through suitable reduction gearing 46 and 47 drives a sprocket wheel 48 keyed to a shaft 49. To the other end of the shaft 49 is fixed a sprocket wheel 50 which together with an idler sprocket wheel 51 carries a chain 52. The carriers 32$^a$ and 32$^b$ of the plow units A and B are fixed relative to each other and to one side of the chain 52 by toothed plates 53. The reduction gear unit 47 is also arranged to drive a standard rotary geared switch 54 which is adapted to reverse the current to the motor 45 when the plow units A and B have been moved by the motor 45 to one end or the other of the rolls. Emergency limit switches 55, adapted to be operated by cam fingers 56$^a$ and 56$^b$ may also be provided to reverse the motor 45 in case the regular reversing switch 54 fails to function.

The brackets 35$^a$ and 35$^b$ carry valves 60$^a$ and 60$^b$ operated by electric solenoids 61$^a$ and 61$^b$. Compressed air may be supplied by flexible conduits 62$^a$ and 62$^b$ to hand operated valves 63$^a$ and 63$^b$ from which conduits 64$^a$ and 64$^b$ lead to the electrically operated valves 60$^a$ and 60$^b$. Conduits 65$^a$ and 65$^b$ are provided to connect the other side of the valves 60$^a$ and 60$^b$ to each end of the air motors 34$^a$ and 34$^b$. The solenoids 61$^a$ and 61$^b$ are attached to the valves 60$^a$ and 60$^b$ in such a manner that when no current is flowing in the solenoids the air motors 34$^a$ and 34$^b$ hold the plows 41$^a$ and 41$^b$ in a raised position. However, when the solenoids are energized, the air motors force the plows down to operating position. A pair of brackets 70 fixed at the ends of the frame 23 may be provided to carry a shaft 71 to which is adjustably secured a channel iron 72. Fixed to the channel 72 preferably by spring brackets 73 are switches 74, 75, 76 and 77. The switches 74 and 75 are operated by a cam finger 78 and the switches 76 and 77 by a cam finger 79, which are adjustably fixed to the brackets 35$^a$ and 35$^b$ respectively. The switches 74 and 75 control the operation of the electric solenoids 61$^a$ and thus the operation of the air motors 34$^a$ and the plow 41$^a$ while the switches 76, 77 control the operation of the solenoid 61$^b$ and thus the air motor 61$^b$ and plow 41$^b$ as described hereafter.

While the apparatus may be employed to mix a variety of plastics it is particularly adapted to automatically mix a batch of rubber wherein the operation is as follows: Any large bales or pieces of crude or reclaimed rubber are preferably first broken up by any suitable means. The rubber and the various chemicals that constitute the batch are then dumped into the internal mixer 10 in the desired proportions. The plunger 14 is dropped to close the mixer and the mixing elements 12 are driven to break up and instantly mix the batch whereupon the bottom 15 of the mixer is withdrawn to cause the batch to drop down through the chute 13 onto the rolls 21 and 22.

The front roll 21 can be kept at a different temperature than the rear roll 22 or an operator watching the operation of a plurality of mixers can cause the rubber batch to adhere about the front roll 21. During this time both plows 41$^a$ and 41$^b$ are raised as there is no current in either solenoid 61$^a$ or 61$^b$. The motor 45 is now started and it begins to drive the plow units A and B along above the rolls by means of the chain 52. However, one of the solenoids 61 is energized simultaneously with the starting of the motor 45. When the plow units A and B are moved to the left the right hand solenoid is energized and vice versa. For example in Figure 2 assuming that the motor 45 has just been started and that it is begining to move the plow units to the left then the right hand solenoid 61$^b$ will have been simultaneously energized to move valve 60$^b$ to cause the air motor 34$^b$ to move plow 41$^b$ down into operative relation with the roll 21. As the motor 45 continues to move the plow units along the rolls to the left the plow 41$^b$ cuts the rubber on the roll 21 in a helical line and the plow holding bracket 40$^b$ and the guard 42$^b$ serve to roll up the rubber as it is cut. When the units A and B reach the end of their travel the cam finger 78 of unit A engages with and throws the switch 75 and cam finger 79 of unit B throws switch 76. When switch 75 is thrown the solenoid 61$^a$ of the plow unit A is energized which moves the plow 41$^a$ thereof down into operating position. When the switch 76 is thrown it operates through a standard time relay (not shown) to cut off the current to the solenoid 61$^b$, thus raising the plow 41$^b$. By placing a time relay in the switch circuit, both plows 41$^a$ and 41$^b$ are in operating position for several turns of the roll before the plow 41$^b$ is raised. This is desirable in that it assists in clearing the roll and in properly starting the return cut.

The switch 54 driven from the reduction gearing 47 stops the movement of the plow units to the left at the end of their travel and operates through a time relay (not shown) to reverse the direction of the motor 45. In this manner there is a dwell in the back and forth movement of the plow units which is slightly longer than the time both knives are down in operating position. Soon after the plow 41$^b$ is raised the switch 54 operating through the time relay as above described reverses the motor 45 and the plow units A and B are driven to the right. At this time, however, the plow 41$^a$ is down in operating position and it helically cuts the rubber from the roll 21 in a manner similar to that performed by the plow 41$^b$ and explained above. As at the other end of the travel cut opposite thereto the cam finger 79 of unit B engages with and throws the switch 77 and the cam finger 78 of unit A throws switch 74. The throwing of switch 77 energizes the solenoid 61$^b$ which causes the air motor 34$^b$ to move the plow 41$^b$ into operating position. The switch 74 when thrown operates through a standard time relay (not shown) to cut off the current to the solenoid 61$^a$ to raise the plow 41$^a$. As at the other end of the travel the slow action of the time relay again causes both plows 41$^a$ and 41$^b$ to be in operating position for several turns of the rolls.

The switch 54 as at the other end of the travel causes a dwell and a reversal of travel as above described, whereupon the entire operation will be continuously repeated until the batch has been thoroughly and completely mixed, at which time the operator removes it from the rolls. As stated above, if the switch 54 fails to stop or reverse the motor 45 at the end of the travel of the plow, then to prevent any possibility of breakage by overrunning the emergency limit switches 55 will engage with cam fingers 56 on the plow units to stop the motor.

The mixing operation produced by the automatic plows is very similar to the manual operation heretofore performed by the operator. In both the rubber is plowed or scraped from the mill roll and rolled upon itself and thereafter dumped back in between the mill rolls. While one batch is completing its mix upon the mill rolls a second batch is generally being initially mixed in the internal mixer 10. In this manner as soon as the first batch has completed its mix on the mill rolls and has been removed, the second initially mixed batch can be immediately dropped down onto the mill rolls to begin its final mixing while a third batch can be placed in the internal mixer 10 to be initially mixed.

While the invention is primarily designed to automatically mix plastic rubber compounds, it will be evident that it is also adapted to handle numerous other plastic compositions.

It will also be apparent that the invention is not limited to the exact method and apparatus above described and illustrated, accordingly various modifications thereof can be resorted to without departing from the spirit of the invention or the scope of the appended claims.

What is claimed is:

1. In plastic mixing apparatus, a pair of cooperating driven mill rolls, a pair of plow units, supporting means adapted to slidably support said plow units above one of said rolls for movement in parallel relation with the axis thereof, driving means adapted to move said plow units back and forth along said supporting means, each of said plow units including a plow and plow carrying means adapted to move the plow into cooperating relation with the surface of said roll, and controlling means operated by the plow units in their movement along their supporting means for controlling the position of said plow carrying means.

2. In plastic mixing apparatus, a pair of cooperating driven mill rolls, a pair of plow units, supporting means adapted to slidably support said plow units above one of said rolls for movement in parallel relation with the axis thereof, driving means adapted to continually move said plow units back and forth along said supporting means, each of said plow units including a plow and plow carrying means adapted to move the plow into cooperating relation with the surface of said roll, guards on said plow carrying means adapted to roll the plastic cut by the plows upon itself, and controlling means operated by the plow units in their movement along their supporting means for controlling the position of said plow carrying means.

3. In plastic mixing apparatus, a pair of driven mill rolls, a pair of plow units, each of said units including a carrier, an air motor fixed to said carrier, a plow holding bracket slidably attached to said carrier, the piston rod of said air motor being adjustably fixed to said plow holding bracket, a plow held by said bracket, supporting means adapted to slidably support the carriers of said plow units above one of said rolls for movement in parallel relation with the axis thereof, driving means adapted to move said plow units back and forth along said supporting means, and controlling means operated by the plow units in their movement along their supporting means for controlling the operation of the air motors and thus the position of the plows of said plow units.

4. In plastic mixing apparatus, a pair of driven mill rolls, a pair of plow units, each of said units including a carrier, an air motor fixed to said carrier, a plow holding bracket slidably attached to said carrier, the piston rod of said air motor being adjustably fixed to said plow holding bracket, a plow held by said bracket, supporting means adapted to slidably support the carriers of said plow units above one of said rolls for movement in parallel relation with the axis thereof, and driving means adapted to move said plow units back and forth along said supporting means.

5. In plastic mixing apparatus, a pair of driven mill rolls, a pair of plow units, each of said units including a carrier, an air motor fixed to said carrier, a plow holding bracket slidably attached to said carrier, the piston rod of said air motor being adjustably fixed to said plow holding bracket, a plow held by said bracket, supporting means adapted to slidably support the carriers of said plow units above one of said rolls for movement in parallel relation with the axis thereof, driving means adapted to move said plow units back and forth along said supporting means, and means for controlling the operation of the air motors of said plow units, said means including a valve on each of said plow units for controlling the supply of air to the air motors, a solenoid on each of said plow units for controlling the operation of said valves and a pair of switches for controlling the operation of each of said solenoids, said switches being fixed relative to said plow units adjacent the opposite ends of travel thereof and adjustable cam fingers on said plow units to operate said switches.

6. In plastic mixing apparatus, a pair of driven mill rolls, a pair of plow units, each of said units including a carrier, an air motor fixed to said carrier, a plow holding bracket slidably attached to said carrier, the piston rod of said air motor being adjustably fixed to said plow holding bracket, a plow held by said bracket, supporting means adapted to slidably support the carriers of said plow units above one of said rolls for movement in parallel relation with the axis thereof, driving means adapted to move said plow units back and forth along said supporting means, solenoid controlled valves for controlling the operation of said air motors on said plow units, and switches fixed at opposite ends of the back and forth travel of said plow units adapted to control the operation of said solenoid valves.

7. In plastic mixing apparatus, a pair of driven mill rolls, a pair of plow units, each of said units including a carrier, an air motor fixed to said carrier, a plow holding bracket slidably attached to said carrier, the piston rod of said air motor being adjustably fixed to said plow holding bracket, a plow held by said bracket, supporting means adapted to slidably support the carriers of said plow units above one of said rolls for movement in parallel relation with the axis thereof, driving means adapted to move said plow units back and forth along said supporting means, a valve on each of said plow units for controlling the operation of said air motors, and means fixed relative to said plow units for controlling the operation of said valves.

8. In plastic mixing apparatus, a pair of cooperating driven mill rolls, a pair of plow units, supporting means adapted to slidably support said plow units above one of said rolls for movement in parallel relation with the axis thereof, driving means adapted to move said plow units back and forth along said supporting means, said means including a reversible electric motor, reduction gearing driven by said motor, a pair of sprockets, a closed chain over said sprockets, means for driving one of said sprockets from said reduction gearing, said chain being fixed at one side to said plow units, and a reversing switch driven by said reduction gearing for reversing the motor, each of said plow units including a plow and plow carrying means adapted to move the plow into cooperating relation with the surface of said roll, and controlling means operated by the plow units in their movement along their supporting means for controlling the position of said plow carrying means.

9. In plastic mixing apparatus, a pair of mill rolls, a pair of plow units slidably supported above said rolls for movement parallel with the axis thereof, said plow units including a plow and plow carrying means adapted to hold said plow in operative or inoperative position with one of said rolls, means for moving said plow units back and forth above the rolls, and means fixed relative to said plow units for operating said plow carrying means to hold the plow of the leading unit in inoperative position and the plow of the trailing unit in operative position during the back and forth travel of the plow units.

10. In plastic mixing apparatus, a pair of co-operating driven mill rolls, a pair of plow units, supporting means adapted to slidably support said plow units above one of said rolls for movement in parallel relation with the axis thereof, driving means adapted to move said plow units back and forth along said supporting means, each of said plow units including a plow and plow carrying means adapted to move the plow into cooperating relation with the surface of said roll, and means fixed relative to said plow units for operating said plow carrying means to hold the plow of the leading unit in inoperative position and the plow of the trailing unit in operative position during the back and forth travel of the plow units.

11. In plastic mixing apparatus, a pair of driven mill rolls, a pair of plow units, each of said units including a carrier, an air motor fixed to said carrier, a plow holding bracket slidably attached to said carrier, the piston rod of said air motor being adjustably fixed to said plow holding bracket, a plow held by said bracket, supporting means adapted to slidably support the carriers of said plow units above one of said rolls for movement in parallel relation with the axis thereof, driving means adapted to move said plow units back and forth along said supporting means, and means fixed relative to said plow units for operating the air motors of said plow units to hold the plow of the leading unit in an inoperative position and the plow of the trailing unit in an operative position during the back and forth travel of the plow units.

12. In plastic mixing apparatus, a pair of driven mill rolls, a plow unit, supporting means adapted to slidably support said plow unit above one of said rolls for movement in parallel relation with the axis thereof, driving means adapted to move said plow unit back and forth along said supporting means, said plow unit including a plow parallel to said roll axis, and plow carrying means adapted to move the plow into cooperating relation with the surface of said roll, and means operated by the plow unit in its movement along its supporting means for controlling the position of said plow carrying means.

13. In plastic mixing apparatus, a pair of driven mill rolls, a plow unit including a carrier, an air motor fixed to said carrier, a plow holding bracket slidably held by said carrier, the piston rod of said air motor being fixed to said plow holding bracket, a plow fixed to said bracket, supporting means to slidably support the carrier of said plow unit above one of said rolls for movement in parallel relation with the axis thereof, driving means adapted to move said plow unit back and forth along said supporting means, and means operated by the plow unit in its movement back and forth for controlling the operation of the air motor and thus the position of the plow of said plow unit.

14. Automatic mill mixing apparatus comprising a pair of rotatable mill rolls, means engageable with the end of one of said rolls for removing therefrom a sheet of rubber, means for reciprocating said removing means axially of the mill roll from one end thereof to the other to roll said rubber sheet into a plurality of convolutions, and means for withdrawing said removing means from the mill roll to permit said rolled sheet to be fed endwise between the mill rolls by the rotation of said rolls.

15. Automatic mill mixing apparatus comprising a pair of rotatable mill rolls, means engageable with the end of one of said rolls for scraping therefrom a sheet of rubber, said means including a plow having a cutting edge parallel to the axis of said mill roll, means for reciprocating said scraping means axially of the mill roll to roll said rubber sheet into a plurality of convolutions, and means for withdrawing said scraping means from the mill roll to permit said rolled sheet to be fed endwise between the mill rolls by the rotation of said rolls.

16. In combination with a pair of rolls for milling rubber, a plow having a blade parallel to the axis of the mill roll reciprocable into engagement with one of said rolls for scraping and rolling the rubber toward the center of said roll.

HORACE D. STEVENS.